United States Patent
Calderon (10) Patent No.: US 11,739,656 B2
(45) Date of Patent: Aug. 29, 2023

(54) IN-FLIGHT MONITORING OF AERO ENGINE HEALTH

(71) Applicant: ROLLS-ROYCE DEUTSCHLAND LTD & CO KG, Dahlewitz (DE)

(72) Inventor: Jorge Calderon, Berlin (DE)

(73) Assignee: ROLLS-ROYCE DEUTSCHLAND LTD & CO KG, Dahlewitz (DE)

(*) Notice: Subject to any disclaimer, the term of this patent is extended or adjusted under 35 U.S.C. 154(b) by 194 days.

(21) Appl. No.: 17/201,695

(22) Filed: Mar. 15, 2021

(65) Prior Publication Data

US 2021/0301679 A1 Sep. 30, 2021

(30) Foreign Application Priority Data

Mar. 31, 2020 (GB) .................................... 2004668

(51) Int. Cl.
*F01D 21/14* (2006.01)
*F01D 21/00* (2006.01)
*F02C 7/36* (2006.01)

(52) U.S. Cl.
CPC .......... *F01D 21/14* (2013.01); *F01D 21/003* (2013.01); *F02C 7/36* (2013.01);
(Continued)

(58) Field of Classification Search
None
See application file for complete search history.

(56) References Cited

U.S. PATENT DOCUMENTS

| 5,293,774 A * | 3/1994 | Ratherham ........... F01D 21/045 |
| | | 73/112.05 |
| 6,176,074 B1 * | 1/2001 | Thompson ................ F02C 9/46 |
| | | 60/773 |

(Continued)

FOREIGN PATENT DOCUMENTS

| EP | 3 040 520 A1 | 7/2016 |
| EP | 3 040 520 B1 | 7/2019 |

OTHER PUBLICATIONS

Sep. 25, 2020 Search Report issued European Patent Application No. GB2004668.6.

(Continued)

*Primary Examiner* — Todd E Manahan
*Assistant Examiner* — David P. Olynick
(74) *Attorney, Agent, or Firm* — Oliff PLC (57) ABSTRACT

A method for in-flight monitoring of the health of an aero gas turbine engine including in flow series a compressor system, a core gas generator including a combustor, and a turbine, and further including a shaft system connecting the turbine to the compressor system and forming a torque path there between. The method includes: measuring a first rotational speed of a forward portion of the shaft system; measuring a second rotational speed of a rear portion of the shaft system; measuring other operational parameters of the engine; calculating from the measured rotational speeds the power delivered by the torque path from the turbine to the compressor system; calculating from the other measured operational parameters the power delivered to the turbine by the core gas generator; correlating the power delivered by the torque path at a given time with the power delivered to the turbine at that time.

14 Claims, 5 Drawing Sheets

(52) U.S. Cl.
 CPC ............... *F05D 2220/323* (2013.01); *F05D 2260/4031* (2013.01); *F05D 2260/80* (2013.01); *F05D 2270/023* (2013.01); *F05D 2270/301* (2013.01); *F05D 2270/303* (2013.01); *F05D 2270/304* (2013.01); *F05D 2270/334* (2013.01); *F05D 2270/335* (2013.01)

(56) References Cited

U.S. PATENT DOCUMENTS

| | | | |
|---|---|---|---|
| 8,744,813 B2 * | 6/2014 | Lacaille | G05B 23/0254 703/2 |
| 8,943,876 B2 * | 2/2015 | Rowe | F02C 7/00 73/112.01 |
| 2013/0312423 A1 * | 11/2013 | Bacic | F01D 21/045 60/779 |
| 2016/0010494 A1 | 1/2016 | Erlund et al. | |
| 2016/0194977 A1 * | 7/2016 | Macdonald | F01D 21/045 73/112.01 |
| 2018/0051587 A1 | 2/2018 | Fletcher | |
| 2018/0163640 A1 | 6/2018 | Dubreuil et al. | |
| 2018/0306125 A1 * | 10/2018 | Renold-Smith | F02C 9/46 |

OTHER PUBLICATIONS

Aug. 16, 2021 Extended Search Report issued in European Patent Application No. 21162095.0.

\* cited by examiner

IN-FLIGHT MONITORING OF AERO ENGINE HEALTH

CROSS-REFERENCE TO RELATED APPLICATIONS

This specification is based upon and claims the benefit of priority from UK Patent Application Number 2004668.6 filed on 31 Mar. 2020, the entire contents of which are incorporated herein by reference.

BACKGROUND

Field of the Disclosure

The present disclosure relates to in-flight monitoring of the health of an aero gas turbine engine.

Description of the Related Art

Modern gas turbine engines typically have up to three compressor-turbine groups, also referred to as spools, connected by respective concentric shafts. These compressor-turbine groups are responsible for the compression and expansion of air passing through the engine.

For example, the Rolls-Royce Trent 1000 aerospace gas turbine engine has three compressor-turbine groups: the low-pressure compressor-turbine group, the intermediate-pressure compressor-turbine group, and the high-pressure compressor-turbine group. Each of these has a corresponding compressor and turbine. In the case of the low-pressure compressor-turbine group, the low-pressure compressor is typically referred to as the fan. The mechanical linkages extending from the turbine to the compressor is commonly referred to as the torque path, i.e. the path along which torque is transmitted.

It is possible, during operation of the gas turbine engine, for a shaft connecting a compressor and turbine pair to fail. This breakage in the shaft leads to an instantaneous decoupling between the turbine and its respective compressor. As a result the compressor may decelerate rapidly, as it is no longer being driven by the turbine, and the turbine may accelerate rapidly, as it no longer driving the compressor.

The rapid acceleration of the turbine is particularly concerning, as over-speed events can lead to disintegration of the turbine, including possibly bursting of the turbine disc, and further damage to the gas turbine engine.

It is important then to rapidly recognise an incipient shaft break within a gas turbine engine, so that the appropriate action can be taken.

A known approach for monitoring for engine shafts, for example as described in US 2018/051587, is for a controller to measure a first rotational speed at one end of a spool and a second rotational speed at another end of the spool. These speeds can be converted into a shaft twist angle, i.e. an amount of twist, which is then compared with a predetermined shaft health monitoring range that may be related to a maximum in-service twist angle. If the shaft twist angle falls within the predetermined monitoring range, the controller can generate a maintenance alert. Low-pressure shafts are relatively long and thus have maximum in-service twist angles of about 20°-25°. By contrast, high-pressure shafts are relatively short and have maximum in-service twist angles of about 2°-3°. The speed measurements can be taken, for example, by Hall effect sensors, magnetic sensors, optical encoders, or even mechanically meshed gears that turn with the shaft.

However, because of the potentially hazardous nature of a shaft break, or indeed any failure or change in the torque path from a turbine to a compressor, it would be desirable to have an improved ability to detect when a spool is distressed, so that early maintenance or avoidance action can be taken.

SUMMARY

According to a first aspect there is provided a method for in-flight monitoring of the health of an aero gas turbine engine comprising in flow series a compressor system, a core gas generator including a combustor, and a turbine, and further comprising a shaft system connecting the turbine to the compressor and forming a torque path therebetween, the method including:
  measuring a first rotational speed of a forward portion of the shaft system;
  measuring a second rotational speed of a rear portion of the shaft system;
  measuring other operational parameters of the engine;
  calculating from the measured rotational speeds the power delivered by the torque path from the turbine to the compressor system;
  calculating from the other measured operational parameters the power delivered to the turbine by the core gas generator;
  correlating the power delivered by the torque path at a given time with the power delivered to the turbine at that time; and
  identifying a possible unhealthy condition of the torque path when the correlation departs from an expected correlation of the power delivered by the torque path with the power delivered to the turbine.

Advantageously, by correlating the power delivered by the torque path at a given time with the power delivered to the turbine at that time it possible to track the behaviour of the torque path over time to provide an early indication of distress in the torque path. This tracking can be effective even when torque path is transmitting a low torque, such that the amount of twist of even a distressed torque path may be low, and thus far from a maximum in-service twist angle.

According to a second aspect there is provided an in-flight health monitoring system of an aero gas turbine engine comprising in flow series a compressor system, a core gas generator including a combustor, and a turbine, and further comprising a shaft system connecting the turbine to the compressor system and forming a torque path therebetween, the control system including:
  a first speed sensor configured to measure a first rotational speed of a forward portion of the shaft system;
  a second speed sensor configured to measure a second rotational speed of a rear portion of the shaft system;
  plural other sensors configured to measure other operational parameters of the engine; and
  a processor configured to: calculate from the measured rotational speeds the power delivered by the torque path from the turbine to the compressor system; calculate from the other measured operational parameters the power delivered to the turbine by the core gas generator; correlate the power delivered by the torque path at a given time with the power delivered to the turbine at that time; and identify a possible unhealthy condition of the torque path when the correlation departs from an expected correlation of the power delivered by the torque path with the power delivered to the turbine Thus the health monitoring system corresponds to, and is suitable for performing, the method of the first aspect. The processor may be a dedicated engine unit, or may be part of a larger engine unit having wider engine monitoring and control responsibilities, such as an electronic engine controller.

According to a third aspect there is provided an aero gas turbine engine comprising in flow series a compressor system, a core gas generator including a combustor, and a turbine, and further comprising a shaft system connecting the turbine to the compressor system and forming a torque path therebetween, and the in-flight health monitoring system of the second aspect.

Optional features of the present disclosure will now be set out. These are applicable singly or in any combination with any aspect of the present disclosure.

The forward portion of the shaft system may be at or adjacent the compressor system. The rear portion of the shaft system may be at or adjacent the turbine.

The turbine may be a low pressure turbine and the compressor system may be a low pressure compressor or a fan. When the compressor system includes a low pressure compressor and a fan located upstream of the low pressure compressor, the shaft system may include a (first) core shaft and a gearbox, the core shaft receiving an input from the turbine and the gearbox receiving an input from the core shaft and outputting drive to the fan so as to drive the fan at a lower rotational speed than the core shaft. The first rotational speed may be measured in front of the gearbox and the second rotational speed may be measured adjacent to or at the turbine; and the method may further include: measuring a third rotational speed of a portion of the shaft system adjacent to and behind the gearbox; calculating from the first and third rotational speeds an amount of twist in the shaft system across the gearbox; and identifying a possible unhealthy condition of the gearbox or possible damage inflicted on the gearbox when the amount of twist in the shaft system across the gearbox departs from an expected amount of twist in the shaft system across the gearbox. In this way it is possible to discern excessive twist in the gearbox, which is a part of the shaft system that can be susceptible to wear due to its gear-mesh connections. The core gas generator may further comprise a second turbine, a second compressor, and a second core shaft connecting the second turbine to the second compressor, wherein the second turbine, the second compressor, and the second core shaft are arranged to rotate at a higher rotational speed than the first core shaft.

Conveniently, the calculation from the measured rotational speeds of the power delivered by the torque path from the turbine to the compressor system can be based on determining an amount of shaft system twist from the measured rotational speeds, and calculating the power delivered by the torque path from the amount of shaft twist. For example, a given shaft system will have a torsional stiffness from which the applied torque, and hence the delivered power, can be calculated for a given amount of shaft twist. In general, the torsional stiffness (including any temperature dependency thereof) of a shaft system is readily determinable, e.g. from experimental measurements and/or shaft system geometry combined with known material properties.

The method may further include: identifying periods of shaft system torsional vibration from the measured rotational speeds; calculating from the measured rotational speeds for the said identified periods torsional vibrational characteristics of the shaft system; and identifying a possible unhealthy condition of the torque path when the calculated torsional vibrational characteristics depart from expected torsional vibrational characteristics of the shaft system. In this way, it is also possible to detect unhealthy conditions of the torque path when the calculated torsional vibrational characteristics depart from expected torsional vibrational characteristics.

Conveniently, the rotational speeds can be measured by magnetic reluctance probe and phonic wheel sets, microwave sensors, Hall effect sensors, optical encoders, and/or gears mechanically meshed to the shaft system. Preferably, the rotational speeds are measured by magnetic reluctance probe and phonic wheel sets and/or microwave sensors.

The other measured operational parameters of the engine may include one or more operational pressures (such as a combustor pressure and an engine inlet pressure), and one or more operational temperatures (such as a working gas temperature at entry to the turbine, a combustor temperature, and an engine inlet temperature), and optionally a fuel flow rate.

The method may further include issuing an engine protection signal in response to identification of a possible unhealthy condition of the torque path. Such a signal can be used, for example, by an engine controller (e.g. an electronic engine controller—EEC) to cut fuel supply into the engine. Additionally or alternatively, such a signal can be used to provide a cockpit indication for pilot reaction, and/or to pre-arm a shaft failure protection system which then waits for confirmation of other metrics to initiate a suitable engine protection action.

As noted above, arrangements of the present disclosure may be particularly, although not exclusively, beneficial for fans that are driven via a gearbox. The input to such a gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. For example, as discussed above, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
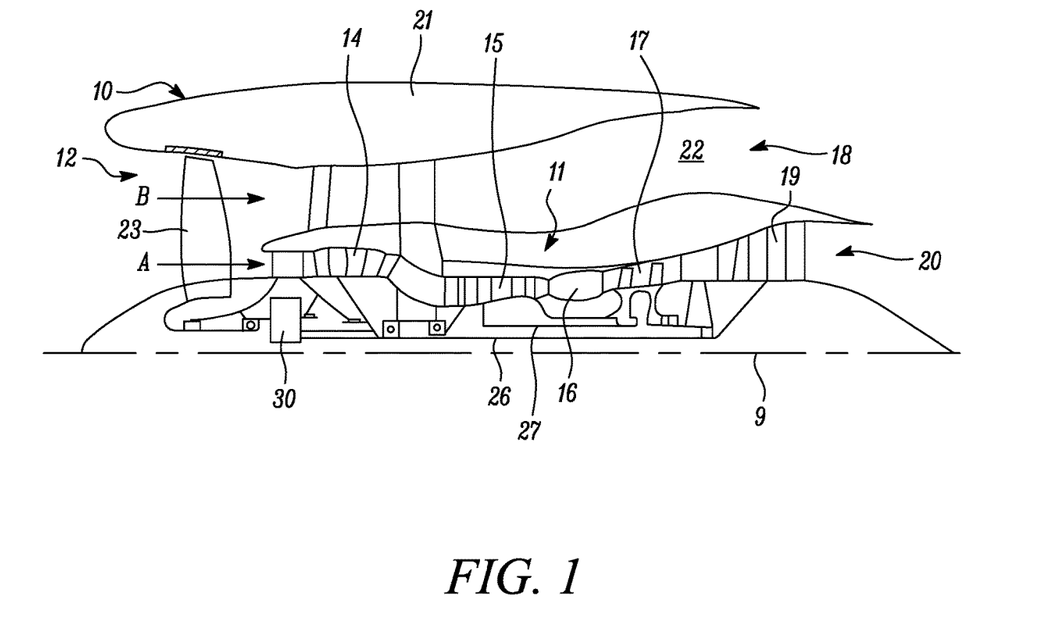
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
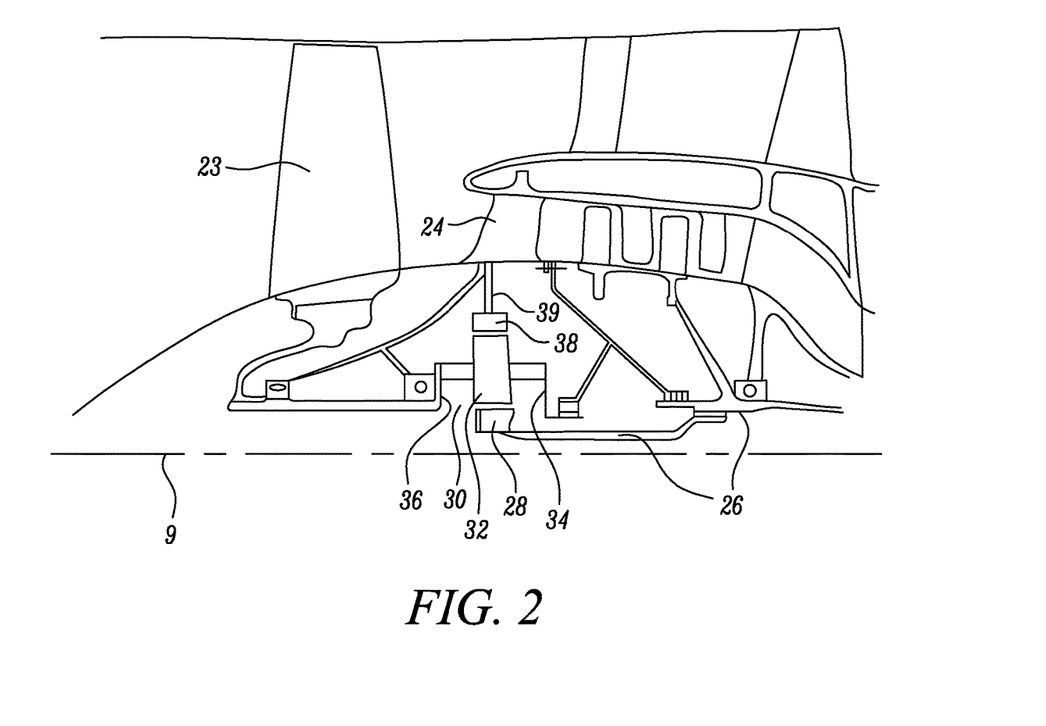
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages including a fan shaft 36 to the fan 23 in order to drive its rotation about the engine axis 9. Radially outwardly of the planet gears 32 and intermeshing therewith is an annulus or ring gear 38 that is coupled, via linkages 39, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
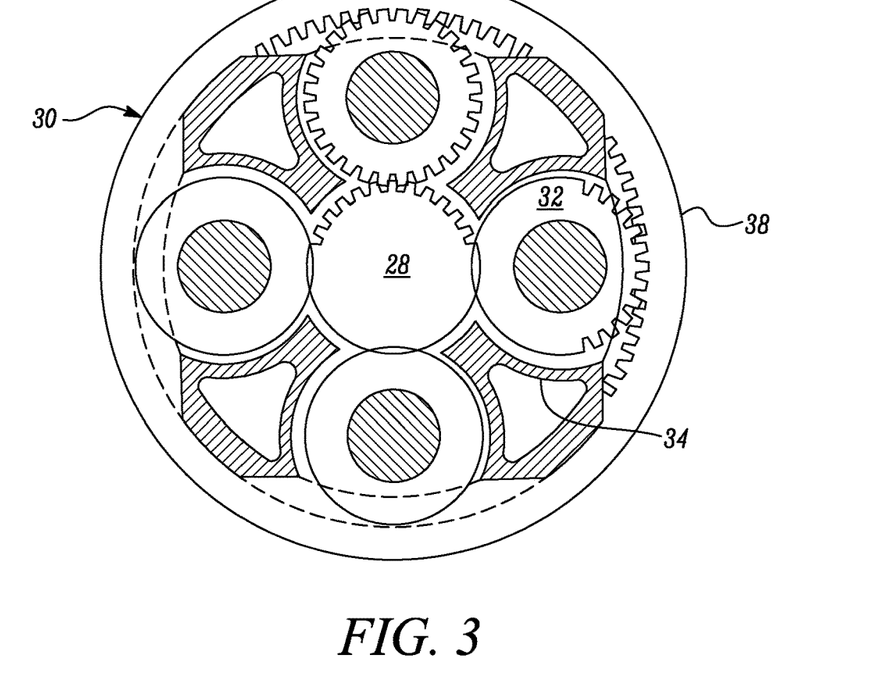
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to the fan shaft 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the fan shaft 36 and the linkages 39 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
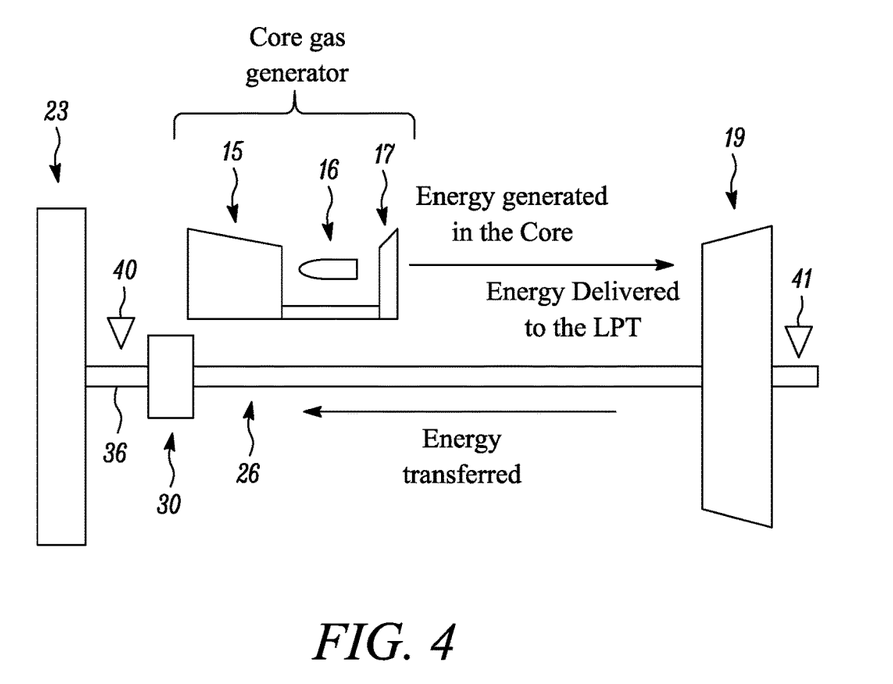
FIG. 4 shows the gas turbine engine in schematic form and fitted with first and second speed sensors.

FIG. 4 shows the gas turbine engine 10 in schematic form. The high-pressure compressor 15, combustion equipment 16, a high-pressure turbine 17 form a core gas generator which generates energy a hot, pressurised, working gas flow that is conveyed to the low-pressure turbine 19. The fan 23 and the low-pressure compressor 14 together form a compressor system.

The low-pressure turbine 19 extracts a substantial portion of the energy contained in the working gas flow and transforms it into mechanical energy that drives the fan 23. More particularly, the low-pressure spool of the engine comprises the low-pressure turbine 19, fan 23 and the shaft system formed by the main shaft 26, the gearbox 30 and other components on the torque path from the turbine 19 to the fan 23. These other components include the fan shaft 36 which takes drive from the gearbox to the fan, and typically also include a drive arm of the low-pressure turbine (i.e. an arm extending between the main shaft 26 and the turbine 19). In the case of a multi-stage turbine, the drive arm includes any inter-stage drive arm(s) of the multi-stage turbine.

Figure 5:
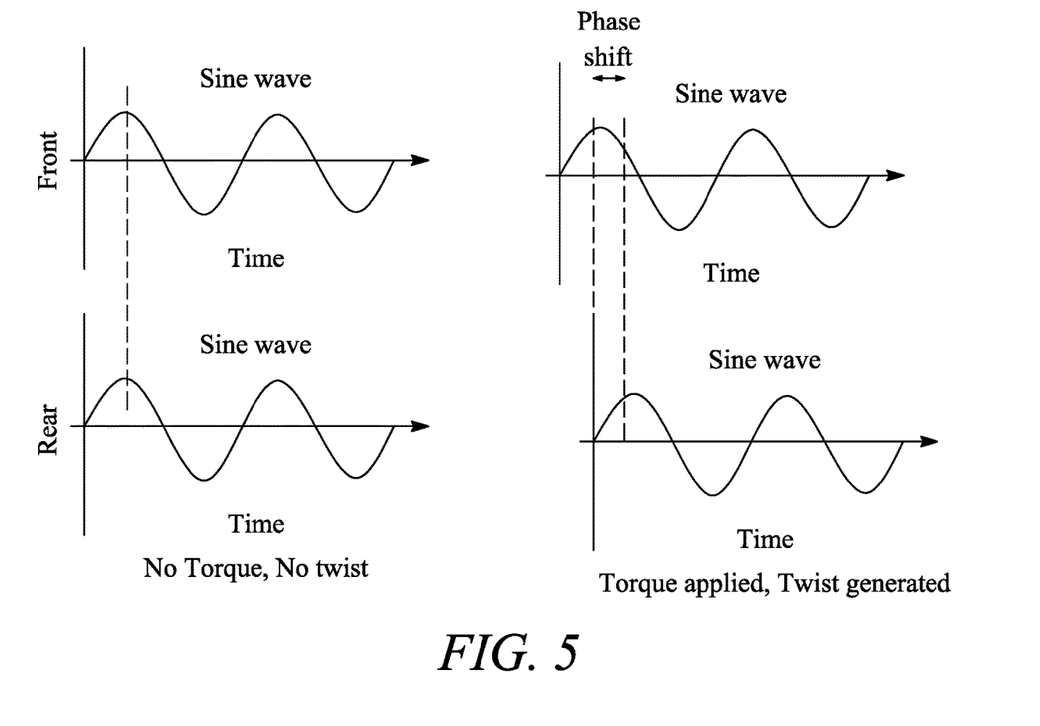
FIG. 5 shows schematically at left pulse signals from front and rear speed sensors of a shaft system with no twist in the system, and at right pulse signals from the sensors with twist in the system.

The low-pressure shaft system is subject to torsional momentum that makes the system twist whilst transferring this mechanical energy. This twist is elastic and normally ranges from 0° to 21°. This twist is detected by measuring a first rotational speed at a forward portion of the shaft system via a front speed sensor 40 adjacent the fan 23 and measuring a second rotational speed of a rear portion of the shaft system via a rear speed sensor 41 adjacent the low-pressure turbine 19. The speed sensors can conveniently be magnetic reluctance sensors located to detect the passage of teeth of respective phonic wheels, or can be of other sort, such as microwave sensors, Hall effect sensors, optical encoders, or gears mechanically meshed to the shaft system. The amount of shaft system twist can then be calculated at any given time by reference to a phase shift between signal pulses from the front and rear speed sensors. This is illustrated in FIG. 5 which shows schematically at left pulse signals from the front and rear sensors with no torque and hence no twist in the shaft system, and at right pulse signals from the sensors with torque and hence twist in the shaft system. The drift in pulse-count between the front and rear sensor signals is a measure of the amount of twist.

The mechanical energy transferred by the torque path formed by the shaft system can then be calculated based on the twist angle, and the known torsional stiffness of the system. In simplified form (i.e. for a shaft of uniform cross-section along its length) $\varphi = (TL)/(GJ)$, where $\varphi$ is angle of twist, T is applied torque, L is shaft length, G is the shear modulus of the material of the shaft, and J is a torsional constant. G and J are shaft material, temperature and shaft geometry dependent. The transferred power can be obtained by multiplying the transferred energy (i.e. the applied torque) by the shaft speed, which is measured by the sensors from the pulse count over time.

In parallel to the determination of energy or power transferred by the transferred by the torque path, a determination is also made of the energy or power delivered by the working gas flow to the low-pressure turbine 19.

In particular, the power extracted from the working gas flow by the low-pressure turbine 19 is related to the core mass flow rate, temperature and expansion ratio through the turbine so that:

$$LPT\_Power = W44 * Cp * \text{delta\_T}$$

where LPT_Power is the extracted power, W44 is the inlet mass flow rate of the working gas to the low-pressure turbine 19, Cp is the specific heat at constant temperature of the working gas, and delta_T is the temperature drop across the low-pressure turbine. However, for many operating conditions of the engine, the LPT_Power can be expressed in terms of more readily measurable parameters.

For example, if the high-pressure 17 and low-pressure 19 turbines are choked (which is effectively the case at high powers), then $W(T/P)^{1/2}$ is fixed at the inlet plane of each of the turbines, where W is mass flow rate of the working gas, T is temperature and P is pressure. Consequently:

$$W(T/P)^{1/2} = K$$

$$\Rightarrow WT \, \alpha \, P\sqrt{T}$$

i.e. the enthalpy flux of the low pressure turbine 19 is proportional to PST. Also, the expansion ratio of the high pressure turbine 17 is fixed, and so P44 is proportional to P30 (the pressure within the combustor 16). For the same low pressure expansion ratio:

$$LPT\_Power \, \alpha \, P44\sqrt{T44} \, \alpha \, P30\sqrt{TGT}$$

where T44 is the inlet temperature to the low-pressure turbine 19 and, TGT is the exhaust temperature from the of the high-pressure turbine 17. This expression can be corrected for factors such as engine inlet temperature and inlet pressure, in known ways, to determine LPT_Power.

Thus, LPT_Power can generally be calculated across different engine conditions from control and operating parameters, such as P30, P20 (the engine inlet pressure), TGT, T30 (combustor temperature), T20 (the engine inlet temperature), EPR (engine pressure ratio), TPR (turbine pressure ratio), fuel flow and the like, standardly measured in aero-engines. U.S. Pat. No. 5,887,419 provides an example of the use of such parameters to calculate turbine power.

In a healthy engine, LPT_Power correlates on the one side with the energy or power delivered by the working gas flow to the low-pressure turbine 19, and on the other side correlates with the energy or power delivered by the torque path from the turbine to the fan 23. Thus there is also a characteristic correlation between the energy or power delivered to the low-pressure turbine and the energy or power delivered by the torque path, such that a comparison of these quantities, as indicated schematically in FIG. 6, can be used to identify a possible unhealthy condition of the torque path. In particular, a mismatch in the characteristic correlation can be used to infer an alteration or modification of the mechanical torque path, and hence an indication of distress in the system that could potentially lead to a hazardous event. Such events include failures in: a shaft 26, 36, the gearbox 30, the drive arm, an inter-stage drive arm and a blade.

Figure 6:
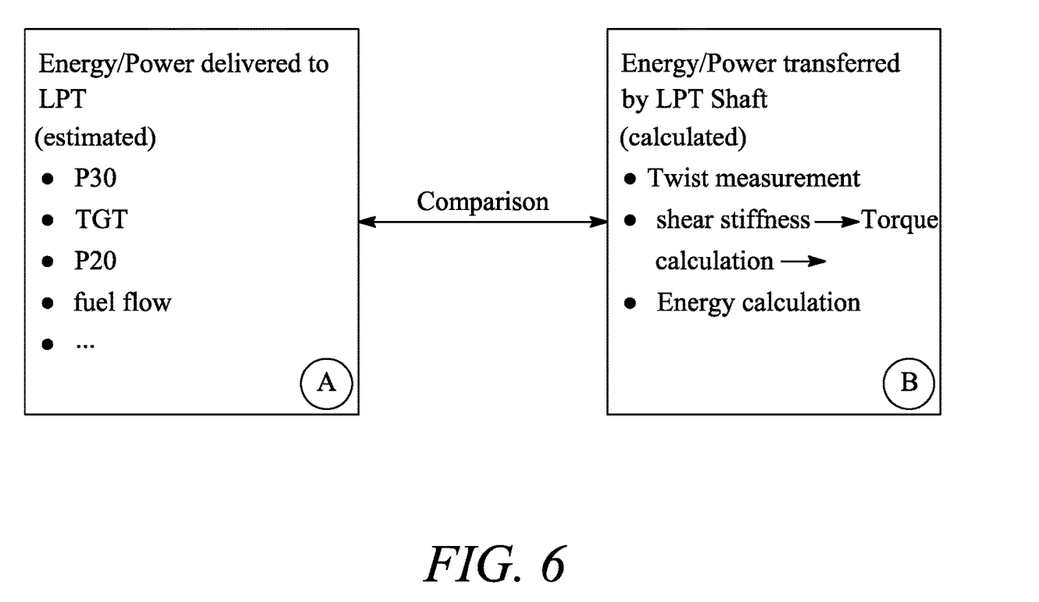
FIG. 6 shows schematically a comparison between A energy/power delivered to a low-pressure turbine and B energy/power delivered by a shaft system from the turbine.
Figure 7:
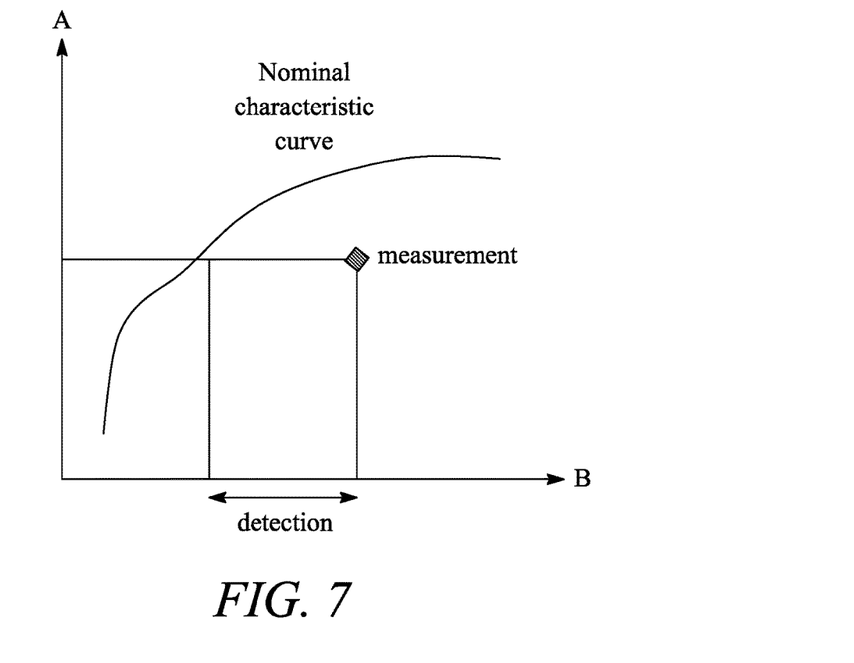
FIG. 7 shows schematically a characteristic correlation curve for the quantities A and B of FIG. 6.

FIG. 7 shows schematically such a characteristic correlation curve for the quantities of FIG. 6. A measurement point detected at a distance from the curve thus indicates a mismatch in the correlation and a possible unhealthy condition of the torque path.

The calculations and correlation discussed above can be performed by a processor (not shown) which is a dedicated engine unit, or which can be part of a larger engine unit having wider engine monitoring and control responsibilities, such as an EEC. Together, the speed the sensors and processor form an in-flight health monitoring system of the engine. The indication of a possible unhealthy condition of the torque path can be used by an automated shaft failure protection system (implemented, for example, as part of the EEC) which may react by cutting the fuel supply into the engine. Other accommodation options are a cockpit indication for pilot reaction, or the pre-arming of a shaft failure protection system which then waits for confirmation of other metrics to initiate a suitable accommodation action.

Figure 8:
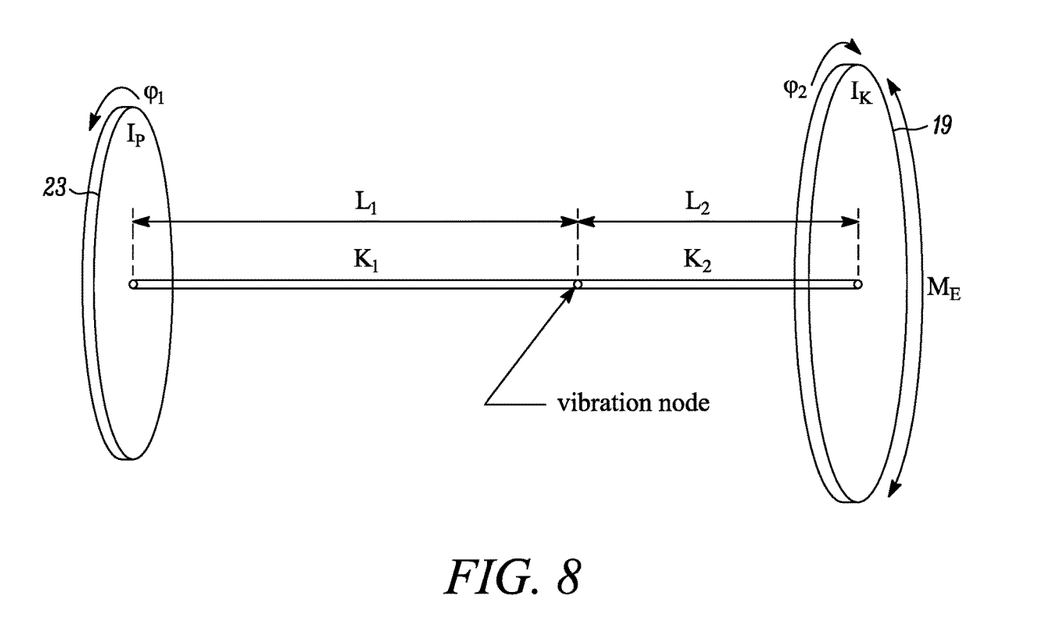
FIG. 8 shows a simplified model of the shaft system torsionally vibrating about a node.

FIG. 8 shows a simplified model of the shaft system torsionally vibrating about a node. The torsional characteristics of the shaft system are given by differential equations based on twist and shaft system characteristics such as mass moment of inertia, torsional damping, and torsional stiffness. A simplified equation of torsional vibration around one node can be presented in the following form:

$$I\ddot{\varphi} + C\dot{\varphi} + K\varphi = M_E(t)$$

where I is a mass moment of inertia vector, C is a torsional damping vector, K is a torsional stiffness vector, and $M_E$ is a moment of force input at time t.

Since the measured rotational speeds allow the amount of twist to be calculated at any moment in time, it is also possible to detect unhealthy conditions of the torque path when the calculated torsional vibrational characteristics depart from expected torsional vibrational characteristics of the shaft system. In particular, these characteristics can be detected during periods of shaft system torsional vibration, such as can occur when there is a discrete torsional input, during transient manoeuvres or when the shaft system is rotating at a resonant condition.

Figure 9:
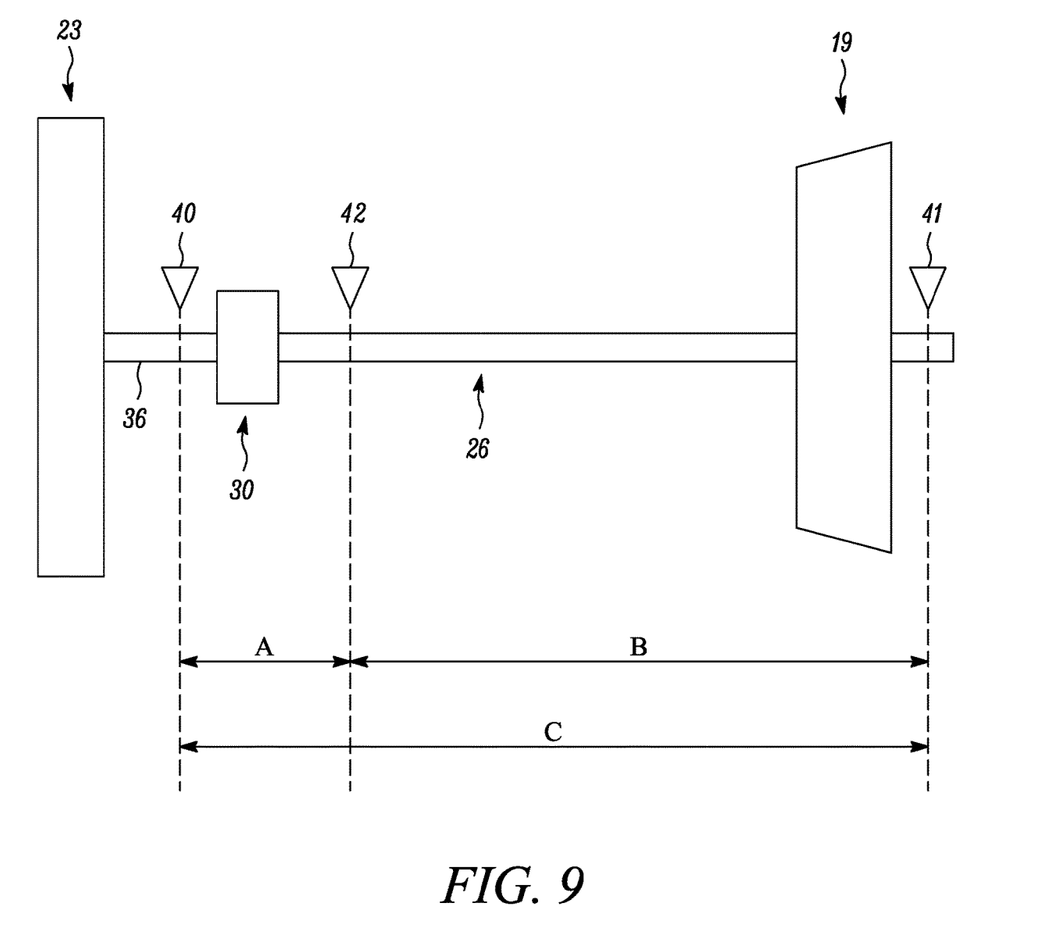
FIG. 9 shows the schematic gas turbine engine of FIG. 4 and fitted with a third speed sensor.

FIG. 9 shows the fan 23, shaft system and low-pressure turbine 19 of the gas turbine engine 10 in schematic form, and with the addition of a third speed sensor 42 adjacent to and behind the gearbox 30. In this way, twist monitoring is possible along shaft sections A (across the gearbox), B (from behind the gearbox to the low-pressure turbine) and C (from the fan to the low-pressure turbine). In particular, with this arrangement it is possible to discern excessive twist in the gearbox; one of the parts of the shaft system most susceptible to wear due to its gear-mesh connections. Wear in the gears can reveal itself by excessive twist along shaft section A at certain levels of power delivered through the shaft system to the compressor, which power levels can themselves be determined from the twist along shaft section B.

Another option with the arrangement of FIG. 9 is to monitor for transient instances of excessive twist in the gearbox by measuring the twist along shaft section A. Such transients can be correlated with events such as external impacts on the engine, e.g. from a foreign body. This can help in the determination of stress factors for fatigue calculations that are used to determine the life of components.

The various approaches described above for monitoring torque paths may be implemented in a health monitoring system singly or in any combination.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

All references cited above are hereby incorporated by reference.

I claim:

1. A method for in-flight monitoring of health of an aero gas turbine engine comprising, in flow series, a compressor system including a low pressure compressor and a fan upstream of the low pressure compressor, a core gas generator including a combustor, a turbine, and a shaft system connecting the turbine to the compressor system and forming a torque path therebetween, the shaft system including a core shaft, a fan shaft and a gearbox, the core shaft receiving an input from the turbine and the gearbox receiving an input from the core shaft and outputting drive to the fan shaft so as to drive the fan shaft at a lower rotational speed than the core shaft, the fan shaft driving the fan, the method comprising:
   measuring a first rotational speed of the fan shaft in a forward portion of the shaft system in front of the gearbox;
   measuring a second rotational speed of the core shaft in a rear portion of the shaft system adjacent to or at the turbine;
   measuring a third rotational speed of the core shaft in a portion of the shaft system adjacent to and behind the gearbox;
   measuring other operational parameters of the engine, the operational parameters including at least one operational parameter associated with the core gas generator;
   calculating power delivered by the torque path from the turbine to the compressor system from the measured rotational speeds;
   calculating power delivered to the turbine by the core gas generator from the other measured operational parameters;
   correlating the power delivered by the torque path at a given time with the power delivered to the turbine at that time;
   calculating an amount of shaft twist in the shaft system across the gearbox from the first and third rotational speeds; and
   identifying distress of the torque path in-flight that could potentially lead to a hazardous event when the correlation departs from an expected correlation of the power delivered by the torque path with the power delivered to the turbine when the amount of shaft twist departs from an expected amount of shaft twist in the shaft system across the gearbox.

2. The method of claim 1, wherein the calculation of the power delivered by the torque path from the turbine to the compressor system from the measured rotational speeds is based on determining an amount of shaft system twist in the core shaft, and calculating the power delivered by the torque path from the amount of shaft twist in the core shaft.

3. The method of claim 1, further including:
   identifying periods of shaft system torsional vibration from the measured rotational speeds;
   calculating torsional vibrational characteristics of the shaft system from the measured rotational speeds for the identified periods; and
   identifying a possible unhealthy condition of the torque path when the calculated torsional vibrational characteristics depart from expected torsional vibrational characteristics of the shaft system.

4. The method of claim 1, wherein the rotational speeds are measured by magnetic reluctance probe and phonic wheel sets and/or microwave sensors.

5. The method of claim 1, wherein the other measured operational parameters of the engine include one or more operational pressures, and one or more operational temperatures.

6. The method of claim 1, wherein the hazardous event is a failure in at least one of a shaft, the gearbox, a drive arm, an inter-stage drive arm, and a blade.

7. An in-flight health monitoring system of an aero gas turbine engine comprising in flow series a compressor system including a low pressure compressor and a fan upstream of the low pressure compressor, a core gas generator including a combustor, and a turbine, and further comprising a shaft system connecting the turbine to the compressor system and forming a torque path therebetween, the shaft system including a core shaft, a fan shaft and a gearbox, the core shaft receiving an input from the turbine and the gearbox receiving an input from the core shaft and outputting drive to the fan shaft so as to drive the fan shaft at a lower rotational speed than the core shaft, the fan shaft driving the fan, the control system comprising:
   a first speed sensor configured to measure a first rotational speed of the fan shaft in a forward portion of the shaft system in front of the gearbox;
   a second speed sensor configured to measure a second rotational speed of the core shaft in a rear portion of the shaft system adjacent to or at the turbine;
   a third speed sensor configured to measure a third rotational speed of the core shaft in a portion of the shaft system adjacent to and behind the gearbox;
   plural other sensors configured to measure other operational parameters of the engine, the operational parameters including at least one operational parameter associated with the core gas generator; and a processor configured to:
   calculate a power delivered by the torque path from the turbine to the compressor system from the measured rotational speeds;
   calculate a power delivered to the turbine by the core gas generator from the other measured operational parameters;
   correlate the power delivered by the torque path at a given time with the power delivered to the turbine at that time;
   calculate an amount of shaft twist in the shaft system across the gearbox from the first and third rotational speeds; and
   identify distress of the torque path in-flight that could potentially lead to a hazardous event when the correlation departs from an expected correlation of the power delivered by the torque path with the power delivered to the turbine when the amount of shaft twist departs from an expected amount of shaft twist in the shaft system across the gearbox.

8. The system of claim 7, wherein the calculation by the processor from the measured rotational speeds of the power delivered by the torque path from the turbine to the compressor system is based on an amount of shaft twist in the core shaft, and calculating the power delivered by the torque path from the angular deflection the amount of shaft twist in the core shaft.

9. The system of claim 7, wherein the processor is further configured to:
   identify periods of shaft system torsional vibration from the measured rotational speeds;

calculate torsional vibrational characteristics of the shaft system from the measured rotational speeds for the identified periods; and identify a possible unhealthy condition of the torque path when the calculated torsional vibrational characteristics depart from expected torsional vibrational characteristics of the shaft system.

10. The system of claim 7, wherein the speed sensors are magnetic reluctance probes and phonic wheel sets and/or microwave sensors.

11. The system of claim 7, wherein the other measured operational parameters of the engine include one or more operational pressures, and one or more operational temperatures.

12. An aero gas turbine engine comprising in flow series a compressor system, a core gas generator including a combustor, and a turbine, and further comprising a shaft system connecting the turbine to the compressor system and forming a torque path therebetween, and the in-flight health monitoring system of claim 7.

13. The aero gas turbine engine according to claim 12, wherein the compressor system includes a low pressure compressor and a fan located upstream of the low pressure compressor, and the shaft system includes a core shaft and a gearbox, the core shaft receiving an input from the turbine and the gearbox receiving an input from the core shaft and outputting drive to the fan so as to drive the fan at a lower rotational speed than the core shaft.

14. The system of claim 7, wherein the hazardous event is a failure in at least one of a shaft, the gearbox, a drive arm, an inter-stage drive arm, and a blade.

* * * * *